C. W. FREDERICK AND D. H. STEWART.
PHOTOGRAPHIC APPARATUS.
APPLICATION FILED DEC. 30, 1918.
1,411,689.
Patented Apr. 4, 1922.
2 SHEETS—SHEET 2.
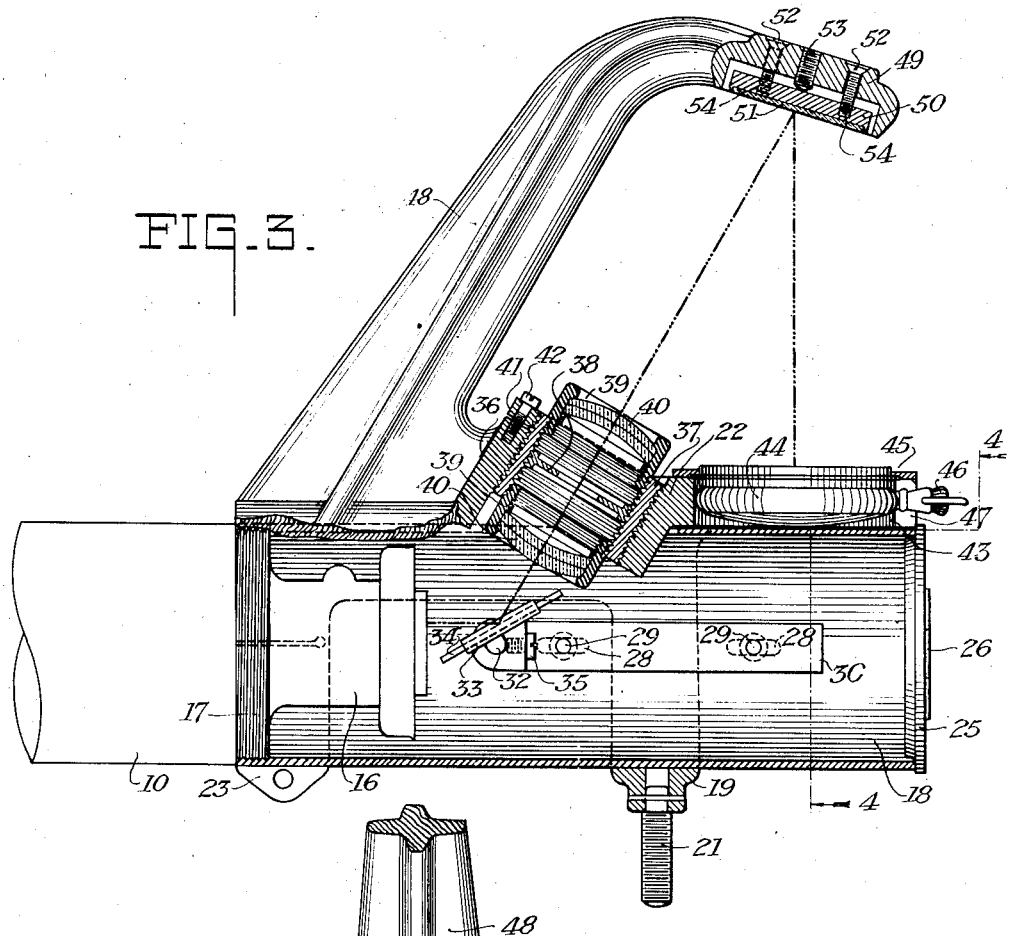
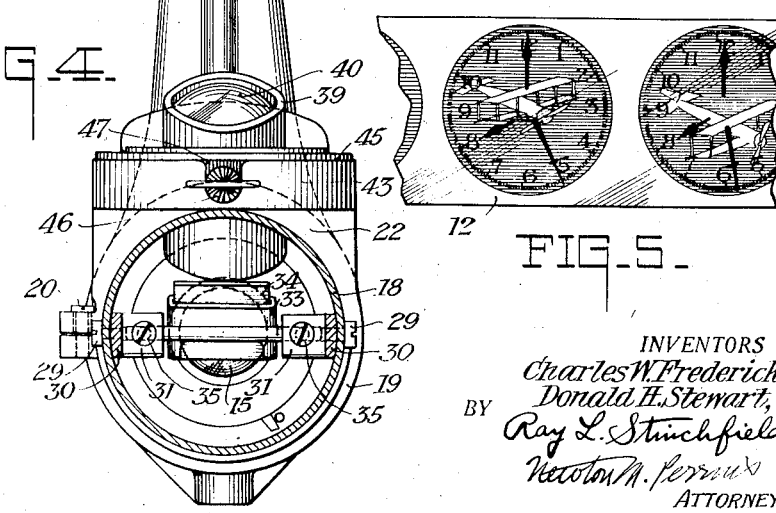
INVENTORS
Charles W. Frederick &
Donald H. Stewart,
BY Ray L. Stinchfield
Newton A. Perreux
ATTORNEYS.

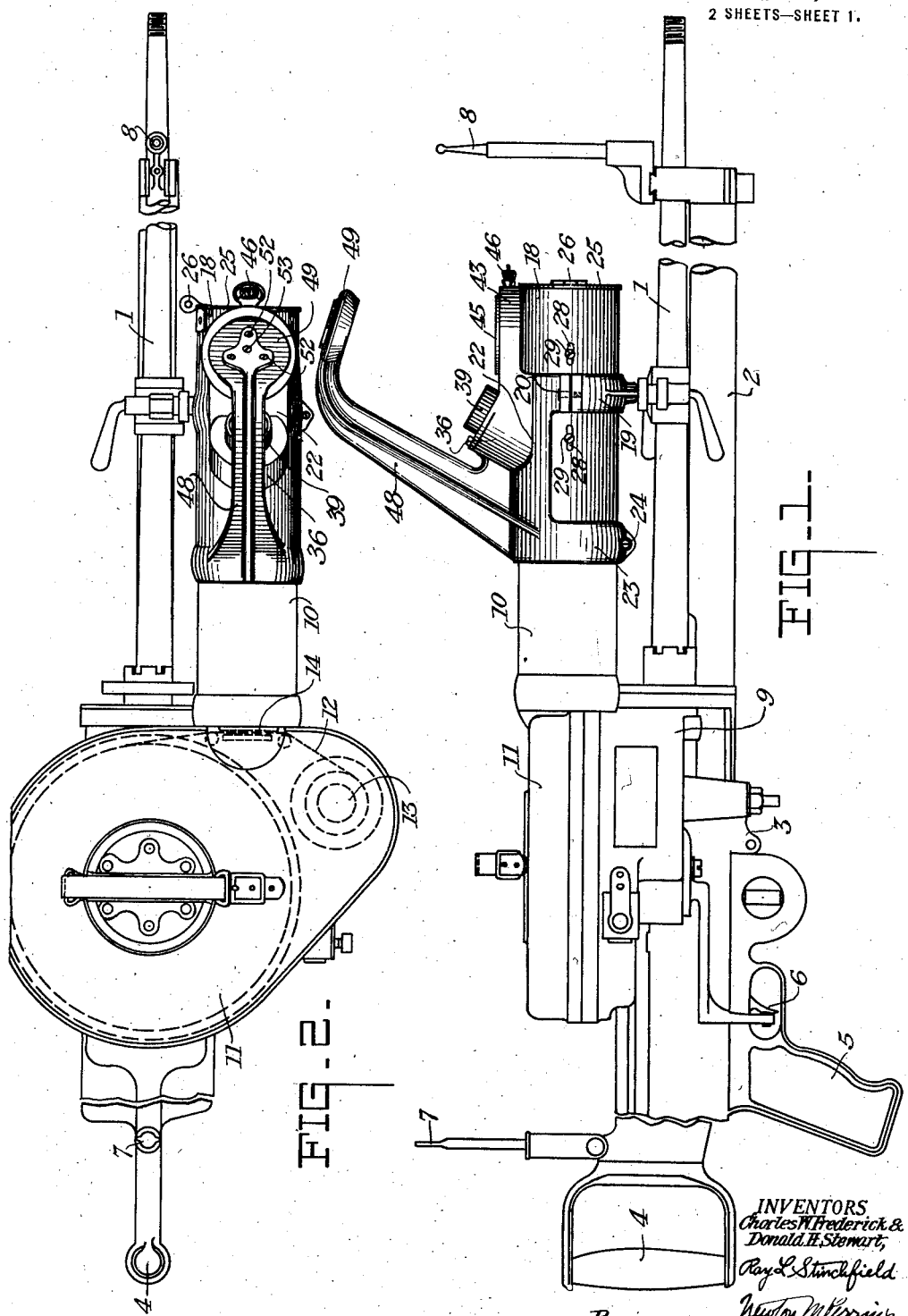

UNITED STATES PATENT OFFICE.

CHARLES W. FREDERICK AND DONALD H. STEWART, OF ROCHESTER, NEW YORK, ASSIGNORS TO EASTMAN KODAK COMPANY, OF ROCHESTER, NEW YORK, A CORPORATION OF NEW YORK.

PHOTOGRAPHIC APPARATUS.

1,411,689.     Specification of Letters Patent.     Patented Apr. 4, 1922.

Application filed December 30, 1918. Serial No. 268,967.

*To all whom it may concern:*

Be it known that we, CHARLES W. FREDERICK and DONALD H. STEWART, citizens of the United States of America, residing at Rochester, in the county of Monroe and State of New York, have invented certain new and useful Improvements in Photographic Apparatus, of which the following is a full, clear, and exact specification.

Our present invention relates to photography and more particularly to a camera attachment whereby there may be recorded on the same sensitized area the properly focused images of objects at different distances and in different fields of view.

We attain the desired end by placing before the camera lens a mirror which projects through the lens the reflected image of one field and permits the passage through the lens of the rays from its normal field. While the applications of our invention are manifold and we contemplate as within the scope thereof the adaptation of any type of camera where double images or "ghosts" are desired, we present as a perfected embodiment thereof an attachment designed for use with gun cameras of the type disclosed in the patents of John A. Robertson and Philip W. Tierney No. 1,318,803, granted Oct. 14, 1919, and No. 1,360,443, granted Nov. 30, 1920.

This camera, as described in those applications, is embodied in a Lewis type machine gun, which is the type largely used at present by aviators in aerial combat. Student aviators engaging in practice combats operate the camera by means of the gun trigger in exactly the same way as the gun is operated in actual combat. The purpose of this invention is to apply to the target images, simultaneously with their impression, the image of a time piece, so that it will be possible to perceive which of several aviators first found his target or to ascertain the interval between shots or any other information relative to the time of shooting.

Reference will be made to the accompanying drawings, in which:

Fig. 1 is a side elevation of my attachment in place on a gun camera;

Fig. 2 is a top view of the same;

Fig. 3 is a sectional view of the attachment;

Fig. 4 is a section taken on line 4—4 of Fig. 3, and

Fig. 5 shows a portion of film with developed superposed images as made by the camera with our attachment.

Similar reference characters throughout the several views designate the same parts. The parts of the machine gun and camera are shown in outline only, while the attachment embodying our invention is fully shown and shaded. Referring first to the general features, the gun comprises a barrel 1, gas chamber 2, breech frame 3, stock 4, pistol grip 5, trigger 6 and sights 7 and 8; and the camera includes a casing 9, a tube 10 and a film magazine 11. The film 12 is drawn automatically from the feed spool 13 past the exposure position 14 in the focal plane of the lens 15, to the magazine. The trigger may be operated to cause either a single exposure or a series of rapidly successive exposures. The structure above referred to is fully shown and described in the patents specified and constitutes no part of our invention, but is mentioned in order to give a clear understanding of the method of use of the attachment embodying our invention, which will now be particularly described.

The tube 10 terminates in a casing 16 containing a lens 15 and a shutter, this casing being of less diameter than the tube. The end of the tube is screw threaded at 17, and a tubular casing 18 is adapted to be screwed thereon. This casing surrounds casing 16, and is held rigidly in place on the gun by a bracket 22 which has an extension 19 surrounding the casing 18 and rigidly secured around it by screw 20. It is held rigidly in place on the barrel 1 of the gun by an attaching means 21 of any suitable character. This bracket member has rear arms 23 also surrounding casing 18 and rigidly held in place by screw 24.

The casing 18 has a cover 25 hinged thereto at 26 to close the end of the casing when not in use. In the upper wall of this casing is an opening 27. In the side walls of the casing are slots 28 in which are adjustably mounted screws 29 which support bars 30 which lie within and along the side walls of the casing. From these bars extend projections 31 opposite to each other, and each having sockets in which lie trunnions 32 of a frame 33, carrying a mirror 34, the trunnions being held in place by screws 35 so that the mirror can be angularly adjusted.

The bracket 22 has a screw threaded socket 36 in which is fitted an internally and externally threaded mount 37, in which the components of a lens are adjustably fitted. As shown, a diaphragm 38 and two mounts 39 carrying lens components 40 are used. A part 41 of socket 36 is partially severed and a screw 42 can be used to tighten it and jam the mount in adjusted position.

At the end of the bracket is a seat 43 for an instrument 44, here shown as a watch. A cover rim 45 holds the watch rigidly in position, and the stem 46 of the watch extends through an aperture 47 in the edge of the seat so that it can readily be manipulated. An arm 48 extends angularly from the bracket, and its end 49 is bent and shaped to constitute a support for plate 50 carrying a mirror 51. The plate is held in position by screws 52, which with screw 53, can be adjusted to tilt or position the mirror at exactly the right inclination.

It will be noticed that the mirror 34 is not mounted centrally of the tubular casing 18, but is above the axis thereof. Light can therefore reach the lens 15 through the open end of the casing, passing beneath the mirror, as is clearly shown in Fig. 4. Light rays also reach the lens from the reflecting surface of the mirror. The lens 15, when the camera is assembled, is adjusted so that parallel rays will be brought to a focus at the exposure plane 14. The components of the supplemental lens are so adjusted, in assembling the instrument that the image of the watch face is also brought to a focus in the same exposure plane. The supplemental lens as a whole is necessarily a positive lens. The positions of the mirrors are also adjusted at the time of assembly so as to center the image of the watch on the exposure area. When once properly adjusted and focused, these parts need no further attention except to correct such errors as may be caused by accident or jar.

It is well known that when an obstacle is placed close to a lens that the image of the obstacle will not be reproduced at the focal plane of the lens, but the obstacle will merely serve to stop down the lens. While the shape of such obstacle may affect the quality of the images, it will not affect the shape of the field, unless the obstacle is at some distance from the lens. In the present instance, we place the mirror 34 so close to the principal lens 15 that rays from all parts of the normal field of the lens,—that is, rays entering from the open end of casing 18— reach a portion of the lens 15 and the image of the entire normal field is focused at the exposure area. At the same time, light rays from the instrument 44 are reflected from mirror 51 to the supplemental lens and are then again reflected through the principal lens 15, the focusing and adjusting being such that the image is focused centrally of the exposure area 14 and is superposed on the image of the normal field.

The mirror 34 can be adjusted at different angles and at different distances from the lens 15 by reason of the adjustable relation of the screws 29 and slots 28 and the pinions 32. When at a certain distance from the lens it is found to introduce a certain amount of haze or flare, and this may be useful in giving scenic effects, where such a haze may be desirable in some applications of the attachment. By the substitution of another supplemental lens or varying the position of the components of the lens used, the magnifying power and focal length of the optical system may be varied to alter the size of the image or to suit changes in the position of the object.

The mirror 51 is so mounted that its inclination may be varied in any direction. The central screw 53 merely bears against the rear surface of the support 50, while the three screws 52 engage threaded holes 54 in the support, and by these the mirror can be accurately positioned.

The position of the watch on the casing is so chosen that the largest amount of illumination from all sides will reach it. In Fig. 5 is shown a developed negative film made from such an exposure, the image of an aeroplane being obtained from the normal field and the images of the watch dial and hands being obtained from watch 43. Only such portions of the watch as are necessary are made highly reflective, the rest of the watch being dark.

Although the lens used may be highly corrected and used at a wide aperture, where there would usually be little depth of field, it is to be noted that it is possible to simultaneously photograph a near and a distant object. The scale on which the watch is reproduced is much greater than that of the object in the normal field. It is, therefore, not necessary, in this particular application of the attachment, to scrutinize closely a small image of a distant timepiece; but the large image is at once visible and the band of film can be quickly examined. The difference in magnifying power would make it possible to introduce into a scene an object on a pigmy or giant scale, thus giving grotesque effects. By reason of the different fields, the difference in magnifying power applied to each, and the possible adjustments of the parts, it is evident that many desirable applications of this invention to photographic cameras of various types are possible to obtain useful and artistic results.

Having thus described our invention, what we claim as new and desire to secure by Letters Patent is:

1. In combination with a photographic camera having a lens, a supplemental optical system, a part of which lies close to and directly in front of the camera lens and acts both as a stop permitting the passage of light rays from the entire normal field of the camera lens and also as a means for directing through the camera lens light rays from an object outside its normal field.

2. In combination with a photographic camera having a lens, means lying close to and directly in front of a part of the camera lens and acting both as a stop permitting the passage of light rays from the entire normal field of the camera lens and also as a means for directing through the camera lens light rays from an object outside its normal field.

3. In combination with a camera, a reflector mounted obliquely directly in front of a portion only of the lens thereof, so as to project through the lens the reflection of one field, and so close to said lens as to act as a stop to allow the passage of rays from the normal field of the lens so that the images of both fields are superposed on the same exposure area of the camera.

4. In combination with a photographic camera, a reflector in front of the camera lens and close thereto, and adapted to reflect light through a portion only of said camera lens, and a supplemental lens mounted so that light rays passing through said supplemental lens will be reflected by the mirror through said camera lens.

5. In combination with a photographic camera, means for photographing an object outside of the normal field of the camera simultaneously with the photographing of such entire normal field, said means comprising a reflector and a supplementary lens and adapted to direct the rays of light from said object through the camera lens.

6. In a camera, a casing, a principal lens mounted within said casing, a reflector mounted in the casing directly in front of a part of said lens, a supplementary lens mounted in the wall of the casing, an arm on said casing carrying a second reflector and an instrument so mounted on the outside of said casing, that its image is projected by said reflectors and lenses upon the exposure area of the camera, said reflector being positioned in front of a portion only of the principal lens, and so close thereto as to act as a stop.

7. In combination with a camera adapted to expose automatically a series of sensitive surfaces, a measuring instrument associated with said camera and means adapted to throw simultaneously over substantially the entire exposure area both the image of the instrument and the image of the normal field so that each exposed surface will be impressed with superposed images of the instrument and of the normal field of the camera.

8. In a photographic camera, a casing, a principal lens focused for a distant object in its normal field, a reflector mounted in front of said lens, an object, and a supplemental lens, the reflector, lenses and object being so mounted on the casing that the image of the object is directed through the supplemental lens to the mirror, thence through the main lens to the focal plane of the principal lens where it is brought to a focus.

9. An attachment for a photographic camera, comprising a casing adapted to fit over the camera lens, an obliquely arranged reflector within the casing, the casing having an aperture in the side thereof, and a lens mounted in the aperture.

10. An attachment for a photographic camera, comprising a tubular casing, open at both ends, one end being adapted to fit over a camera lens and having an aperture in one side thereof, a reflector mounted obliquely within the casing so as to reflect light entering from the aperture through the end of the casing adapted to fit over a lens, and at the same time permitting light to pass through the casing from end to end.

11. In combination with a photographic camera, a tubular casing adapted to fit over the camera lens and through which an image of the normal field may be obtained, and a support for an instrument in an open position near the outer end of such casing, and means for projecting to the focal plane of the camera lens an image of such instrument.

12. An attachment for a photographic camera, comprising a casing open at both ends and adapted to fit over a camera lens and having an aperture in one side thereof, a reflector mounted within the casing and opposite said opening, said reflector being adjustable longitudinally of the casing.

13. An attachment for a photographic camera, comprising a casing open at both ends and adapted to fit over a camera lens and having an aperture in one side thereof, a reflector mounted within the casing opposite said aperture, and adjustable angularly and longitudinally with respect to the casing.

14. An attachment for a photographic camera, comprising a casing open at both ends and adapted to fit over a camera lens and having an aperture at one end thereof, a reflector mounted at one side of the axis of said casing and adapted to reflect, through the end of the casing adapted to fit over a lens, light entering from the aperture.

15. In a photographic camera, a principal lens, a reflector mounted to project through said lens the image of an object outside the normal field and at the same time permitting rays from the normal field to reach said lens, and means for adjustably and removably mounting a supplemental lens between said reflector and the object outside the normal field.

Signed at Rochester, New York, this 23rd day of December 1918.

CHARLES W. FREDERICK.
DONALD H. STEWART.